United States Patent
Chandler et al.

(10) Patent No.: US 12,411,470 B2
(45) Date of Patent: Sep. 9, 2025

(54) CONTROL SYSTEM PERFORMANCE TRACKING APPARATUS AND METHOD

(71) Applicant: Datumpin Ltd, Surrey (GB)

(72) Inventors: Philip Colin Chandler, Bristol (GB); Darren Mark Brown, Gloucestershire (GB); Michael Sean Finney, Bristol (GB)

(73) Assignee: DATUMPIN LTD, Surrey (GB)

( * ) Notice: Subject to any disclaimer, the term of this patent is extended or adjusted under 35 U.S.C. 154(b) by 307 days.

(21) Appl. No.: 17/919,344

(22) PCT Filed: May 10, 2021

(86) PCT No.: PCT/GB2021/000053
§ 371 (c)(1),
(2) Date: Oct. 17, 2022

(87) PCT Pub. No.: WO2021/229199
PCT Pub. Date: Nov. 18, 2021

(65) Prior Publication Data
US 2023/0161313 A1    May 25, 2023

(30) Foreign Application Priority Data
May 12, 2020   (GB) ..................................... 2006981

(51) Int. Cl.
*G05B 19/05*   (2006.01)
(52) U.S. Cl.
CPC .. *G05B 19/058* (2013.01); *G05B 2219/14006* (2013.01)

(58) Field of Classification Search
None
See application file for complete search history.

(56) References Cited

U.S. PATENT DOCUMENTS

| | | | |
|---|---|---|---|
| 6,799,080 B1 * | 9/2004 | Hylden | G05B 19/409 700/83 |
| 2003/0120465 A1 | 6/2003 | Mets | |
| 2008/0154393 A1 * | 6/2008 | Reshef | G05B 19/4183 700/65 |
| 2012/0304251 A1 * | 11/2012 | Liu | H04L 63/10 726/1 |
| 2014/0135947 A1 * | 5/2014 | Friman | G05B 13/04 700/29 |

(Continued)

OTHER PUBLICATIONS

Qiu et al, "Internet based SCADA display system", Jan. 2002, IEEE Computer Applications in Power, pp. 1-6 (Year: 2002).*

(Continued)

*Primary Examiner* — David Earl Ogg
(74) *Attorney, Agent, or Firm* — Jackson Walker LLP

(57) ABSTRACT

The present invention relates to a control system performance tracking apparatus comprising: a data memory device coupled in use to a plurality of control devices of a control system, the data memory device being configured to: monitor the plurality of control devices; receiving data related to inputs, outputs and events of each control device; time stamp said data on a common time base; and store a resulting time-based sequence data for each of the plurality of control devices; and a processor configured to compile the sequence data for the plurality of control devices into a common data stack.

14 Claims, 8 Drawing Sheets

(56) References Cited

U.S. PATENT DOCUMENTS

| | | | |
|---|---|---|---|
| 2015/0073751 A1* | 3/2015 | Liao | G05B 19/058 |
| | | | 702/185 |
| 2018/0267510 A1* | 9/2018 | Nishiyama | G05B 19/4183 |
| 2018/0285398 A1 | 10/2018 | Nishiyama et al. | |
| 2018/0314225 A1* | 11/2018 | Bisse | G05B 19/05 |
| 2018/0329942 A1* | 11/2018 | Kawanoue | G06F 16/2474 |
| 2020/0142380 A1* | 5/2020 | Karlsson | G06F 3/0653 |

OTHER PUBLICATIONS

NCS, "Supervisory Control and Data Acquisition (SCADA) Systems", Oct. 2004, Communication Technologies, Inc., pp. 1-58 (Year: 2004).*

"International Search Report"; prepared for application No. PCT/GB2021/000053; authorized officer Alessandro Fulcheri; Jul. 22, 2021; 4 pages.

* cited by examiner

CONTROL SYSTEM PERFORMANCE TRACKING APPARATUS AND METHOD

FIELD OF INVENTION

The present invention relates to a performance tracking apparatus for control systems and to a method of data processing and memory storage to enhance control systems. Particularly, but not exclusively, the apparatus and method relate to control systems including Programmable Logic Controllers (PLC).

BACKGROUND

A Programmable Logic Controller (PLC) is a rugged and reliable form of computer used in control systems. Typically, a PLC receives inputs from connected sensors or input devices, processes the data, and triggers outputs based on pre-programmed instructions in real-time. Thus, the PLC may be used to control devices such as industrial process equipment.

PLCs were developed to replace relay logic systems but remain in common use as they are considered to provide more robust control solutions than computing (PC) based systems. For example, PLCs may be preferred to PC systems due to concerns over cyber security, firmware and software complexity and long-term technical support. Depending on the inputs and outputs, a PLC can for example monitor and react to specific inputs such as pressures, flows or temperatures and following a pre-programmed logic sequence automatically start and stop processes and generate alarms if a machine (i.e. an automation system) fails to achieve a discrete programmed action, for example a valve fails to reach its' design position within a maximum time period. In an industrial context a plurality of PLCs may be arranged and may operate independently or in a networked arrangement.

PLCs typically operate on a logic switch basis, that is inputs or timer's complete software switches (or ladder logic rungs) and produce outputs. This makes them inherently suitable for applications which are reliant upon hard real time control. In order to enable user interaction/control PLC's may be provided with a HMI (human machine interface) and/or a SCADA (supervisory, control and data acquisition) interface (which can, for example, be used to provide a communications link to a central controller). The 'ladder logic' programmed into the PLC may include issuing a 'message' to the HMI or SCADA as part of an event. For example in the event of an unexpected event (for example an input sensor failure or failure of the controller logic to reach an intended conclusion), the programmed sequence of events determined by the program contained in the PLC may cause a message to be issued. These 'messages' typically show on the HMI (human machine interface) and in some cases trends and graphical information may be calculated by the HMI or SCADA (supervisory, control and data acquisition) derived from ladder logic events.

Despite the provision of messages it can be difficult to trace and identify the cause of sequence, input or output deviations from the expected system behaviour in PLC based systems, particularly when dealing with complex systems which may for example include multiple PLCs controlling interdependent devices or systems. For example, it may be appreciated that each PLC will follow its logic sequence in real time and do not maintain sequence information in memory once they step into a subsequent logic step.

Accordingly, there it would be advantageous to provide improved or alternate performance tracking or monitoring apparatus and/or methods of applying memory data processing functions for the purpose of tracking and monitoring control systems, particularly PLC based control systems.

SUMMARY OF INVENTION

According to a first aspect of the invention, there is provided a control system performance tracking apparatus. The apparatus comprises a data memory device coupled in use to a plurality of control devices of a control system, the data memory device being configured to: monitor the plurality of control devices; receiving data related to inputs, outputs and events of each control device; time stamp said data on a common time base; and store a resulting time-based sequence data for each of the plurality of control devices. The apparatus also includes a processor configured to compile the sequence data for the plurality of control devices into a common data stack on a common timebase.

The processor could be integrated into the data memory device. Alternatively, the processor could be either a dedicated or a general-purpose processor in a computing device of the apparatus.

The apparatus may track the performance of a control system over a monitoring period. The data stack may, therefore, be compiled to show the control system behaviour over a monitored time period. It may be appreciated that in the context of embodiments of the invention a data-stack may be understood to mean, for example, an accumulated sequence of control device operational data compiled on a single common time-base. The data-stack may typically represent the data of all discrete control devices which form in combination a complex control system (for example the control system for an industrial process) across a monitored time period (which may for example be an ongoing "live" time period).

In some embodiments at least one of the plurality of control devices may be a Programmable Logic Controller (PLC). Embodiments of the invention may be particularly advantageous when used to monitor control systems using PLCs due to the limitations of PLCs. In another aspect the invention may provide a Programmable Logic Controller (PLC) data processing system. The system includes at least one PLC device comprising an input module to receive inputs from at least one input source; a processor configured to process said inputs according to a control logic stored on a machine readable memory of the processor to provide outputs; and an output module to issue said outputs to a connected device. A data memory device is coupled to the at least one PLC device, the data memory device being configured to: monitor the at least one PLC; receiving data related to inputs, outputs and events of the PLC device; and store a time-based record of the said inputs, outputs and events to compile a record of PLC sequence data.

Embodiments of the invention may enable existing PLC systems to be provided with advanced data processing for monitoring and/or diagnostic. For example, embodiments of the invention mitigate the lack of local processors in a conventional PLC by using the data memory device to record a time-based history of the PLC operational sequence. The time-based history may include all the digital, analog and message events that comprise the PLC operational sequence. In contrast to a conventional PLC based system embodiments of the invention may therefore ensure that the PLC sequence history is not lost when the PLC moves to the next logic steps.

An advantage of embodiments of the invention may be in identifying complex multi root cause events that were either not considered or could not have been anticipated by the original PLC programmer. Such PLC failure modes will often need reassessment and PLC coding changes. For example such issues may arise as a result of wear in aging equipment or accidental damage never considered by the original control system design team. By using the data-stack provided by embodiments, a data driven assessment of a multiple root cause event may be carried out and may be used to provide evidence for control system logic changes.

The events of the PLC device may include messages provided by the processor to a Human Machine Interface (HMI) and/or to a Supervisory, Control and Data Acquisition (SCDA) interface. Further, the data memory device of embodiments may be used to combine a plurality of SCADA sources. For example, a complex control system may include a number of different control devices on different SCADA or central hub monitoring system software protocols (for example this may be particularly common in complex systems that have had additional processes or equipment added over a long operational time). Such SCADA or monitoring systems may have very limited, or even no, ability to be linked directly. Embodiments may therefore provide a means to 'refresh' and incorporate information from one SCADA system and make it compatible with data from other sources.

The data memory device of embodiments may be embedded with at least one PLC device. The data memory device may be embedded and interface with at least one PLC device.

The data memory device may comprise an input interface for receiving data from the at least one PLC device. The data memory device may further comprise a clock, for example a UTC based clock, for example incorporated into a processor. The data memory device may comprise a processor configured to timestamp said received data. The data memory device may comprise machine-readable data storage. The machine-readable storage may, for example, be local data storage and/or networked data storage. The data memory device may comprise an output interface. For example, the output interface may be a wired or wireless network interface.

The input interface between the control device(s) (for example the, or each, PLC) and the data memory device may be a firewalled interface to ensure that the data monitoring system cannot adversely impact the security and/or reliability of the PLC based control systems. For example, the input interface may comprise a unidirectional gateway (which only permits one-way data transfer from the control device to the data memory device and protects the control device from intrusion). The unidirectional gateway may for example be an RS232 transmit (TX) only gateway. The provision of a strict data division at the interface between the data memory device and the control device in embodiments may ensure that methods and systems in accordance with the invention can provide enhanced data analysis and monitoring without compromising the reliability and security advantages of PLC based controls.

The data memory device is connected to a plurality of discrete devices. The discrete devices may include at least one PLC device and may, optionally, also include one or more non-PLC based device. Thus, embodiments may enable integration of data from complex and/or inter-related control systems. The data memory device may be configured to form a time-based data stack of device sequence data (i.e. data sequences from a plurality of discrete devices) against a common time base.

The apparatus of embodiments may further comprise a playback device. The playback device may be configured to enable a user to search and/or replay the data-stack. For example, the playback device may enable a user to search and/or replay the device sequence data from the data memory device. The playback device could for example be integrated into or attached to a computing system.

The apparatus may be configured to use the data-stack to provide predicted future control system behaviour. For example, the apparatus may be configured to identify and project trends in the data-stack. For example, the processor may be configured use one or more algorithms and/or AI for trend identification and/or forward prediction (it will be appreciated that the specific algorithm or AI may be selected depending upon the control system being monitored or tracked). In some embodiments, the apparatus may be further configured to accumulate historical data to form at least one reference data model sequence. The historical data model may, for example, be sampled over a predetermined operating period of the control system (for example an operating period when a performance of the controlled process by the control system is within required parameters). The historical data may for example be updated during operation of the system and could for example use averaged sample data. The data memory device may compare measured sequence data (i.e. "live" or ongoing measured data sequences) to the reference model data to identify operational deviations. The reference sequence data model may itself be a data-stack model representing multiple data inputs compiled over a common time base. Thus, a reference data-stack model may be compared to a measured (for example "live" or current) data-stack.

The data memory device may, for example, compile at least the following groups of data: Digital Input/Output data, Analogue Input/Output data and the event logs. The reference PLC sequence model may comprise Digital Input/Output data to provide reference sequence models for sub-processes. The reference PLC sequence model may comprise Analogue Input/Output data and comparing measured PLC sequence data may comprise comparing data topology. Data topology may for example include rates of change and/or shapes.

In some embodiments the apparatus (for example the data memory device) may combine a plurality of parameters. For example, the apparatus may apply one or more software algorithms and/or equations such that combined data can be incorporated into the common data stack.

The data memory device may be configured to cross-reference time-stamped event log data in the sequence data. Thus, the event data may be used to provide waypoints in the sequence data. The waypoints may be used during data analysis. For example, embodiments may enable 'before event' and 'after event' data to be readily compared. UTC may be used as a timing baseline. This can, for example, address a key weakness in existing controls systems which include PLC based devices since internal clocks of an individual PLC are not linked or synchronised to any external clocks and may therefore deviate.

The system may further comprise a monitoring device. The monitoring device may, for example, be configured to monitor the sequence data from the data memory device. The monitoring device may be arranged to issue an alert or notification based upon deviations from the reference PLC sequence model. The monitoring device may for example be integrated into or attached to a computing system.

According to a further aspect of the invention, there is provided a method of monitoring a control system, the method comprising: providing a data memory device coupled to a plurality of control devices in the control system; using the data memory device to receive data from the plurality of control devices; recording the data from the plurality of control devices against a common time-base; and compiling a time-based data-stack of the recorded data.

In another aspect there is provided a method of monitoring a Programmable Logic Controller (PLC), the method comprising: providing a data memory device coupled to the at least one PLC device; using the data memory device to receive data from the PLC related to inputs, outputs and events of the PLC device; and recording the data against time to compile a time-based record of PLC sequence data.

The method may comprise enabling a user to replay and/or search the PLC sequence data or time-based data-stack. For example, the method may comprise providing a playback device in communication with the data memory device.

The method may comprise generating a time series visualisation of the PLC sequence data referenced to universal calibrated timestamp The method may further comprise accumulating historical data to form at least one reference PLC sequence model. The method may include comparing measured PLC sequence data to the reference PLC model to identify operational deviations. An alert may be issued in response to a detected and/or predicted operational deviation.

PLC sequence data in accordance with the method may be grouped into at least: Digital Input/Output data, Analogue Input/Output data and the event logs. The method may include identifying and/or extracting functional features from the sequence data. For example, methods of embodiments may include identifying cyclic components, underlying trends and/or values outside of a predetermined range (for example a normal operating range).

Whilst the invention has been described above, it extends to any inventive combination of the features set out above or in the following description or drawings.

DESCRIPTION OF THE DRAWINGS

Embodiments of the invention may be performed in various ways, and embodiments thereof will now be described by way of example only, reference being made to the accompanying drawings, in which.

DETAIL DESCRIPTION OF EMBODIMENTS

Figure 1:
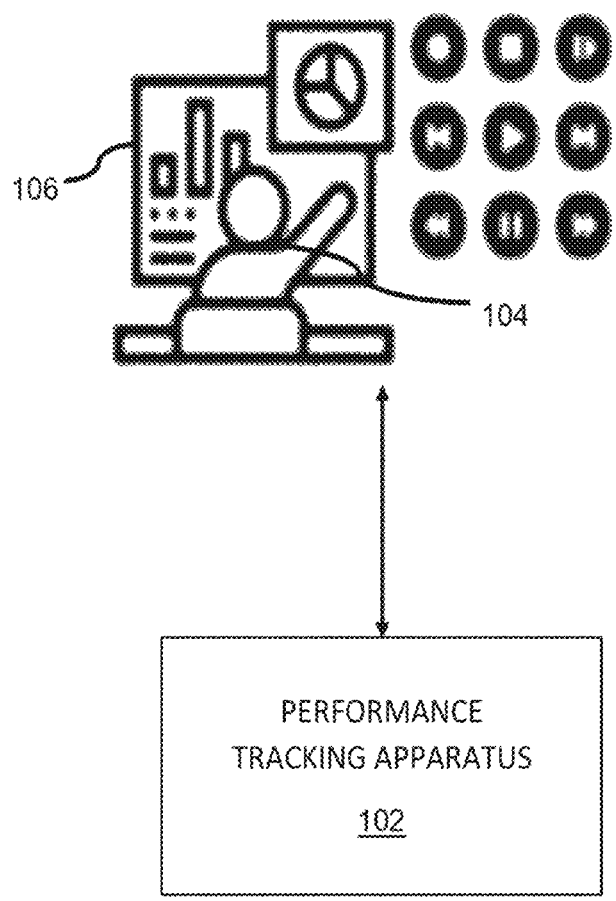
FIG. 1 illustrates an exemplary environment where various embodiments of the present disclosure may function.

The presently disclosed subject matter is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

As used herein, a device or a module may refer to a device or combination of devices that may include hardware, software, firmware, or combination of these. The module may be machine-implemented instructions.

Furthermore, the described features, structures, or characteristics may be combined in any suitable manner in one or more embodiments. In the following description, numerous specific details are provided, to provide a thorough understanding of embodiments of the disclosed subject matter. One skilled in the relevant art will recognize, however, that the disclosed subject matter can be practiced without one or more of the specific details, or with other methods, components, materials, etc. In other instances, well-known structures, materials, or operations are not shown or described in detail to avoid obscuring aspects of the disclosed subject matter. The following detailed description should be read with reference to the drawings, in which similar elements in different drawings are identified with the same reference numbers. The drawings, which are not necessarily to scale, depict illustrative embodiments and are not intended to limit the scope of the disclosure.

It is to be understood that both the foregoing general description and the following detailed description are exemplary and explanatory only, and are not restrictive of the invention, as claimed. In this application, the use of the singular includes the plural, the word "a" or "an" means "at least one", and the use of "or" means "and/or", unless specifically stated otherwise. Furthermore, the use of the term "including", as well as other forms, such as "includes" and "included", is not limiting. Also, terms such as "element" or "component" encompass both elements and components comprising one unit and elements or components that comprise more than one unit unless specifically stated otherwise.

FIG. 1 illustrates an exemplary environment 100 where various embodiments of the present disclosure may function. As shown, the environment 100 includes a performance tracking apparatus 102, a user 104, and a display device 106.

The performance tracking apparatus 102 hereinafter may also be referred as a system 102.

The performance tracking apparatus 102 is configured to receive input data from at least one input device, and process the input data to generate formatted outputs or output data for an output device. The system 102 is also configured to generate PLC sequence data based on at least one of the input data, output data, timeseries PLC data, and at least one event log over time. The system 102 may store information comprising at least one of the generated formatted output data, the input data, event logs, the PLC sequence data, and so forth. The information is not lost when the system 102 steps onto a next sequence step.

The system 102 is also configured to enable the user 104 to search the PLC sequence data from the stored information and playback the PLC sequence data e.g. on the display device 106. In some embodiment, the display device 106 may be a smartphone, a computer, a laptop computer, a tablet computer, and so forth. The user may view data playback on associated smartphone apps and html format programs on a computing device/display device 106. In some embodiments, the system 102 may process the input data and the timeseries PLC data to create Time Series Visualization for analysis.

In some embodiments, the user 104 can be any person interacting with the system 102. The user 104 may interact with or access the system 102 for analysing the PLC data and for the Time Series Visualization for analysis. In some embodiments, the user 104 can access the system 102 via a dynamic web browser on an associated computing device lie a computer, phone, laptop computer, tablet computer, smart television, and so forth. In alternative embodiment, the user 104 may access the system 102 as a software application or an open source software format for the system on smartphone application and html format programs on the computing device. The disclosed system may ensure total cyber security and validation of the RS232 protected unidirectional gateway firewall.

Further, the system 102 may be configured to enable the playback of the PLC sequence data against a UTC timeline. The PLC sequence data may include system sequence data. In some embodiments, the system 102 may use at least one of three groups of time series PLC data to visualize and interrogate the process under control. The three groups of timeseries PLC data may include Digital Input/Output data, Analogue Input/Output data and the event Logs.

In some embodiments, the system 102 may represent the Digital Input/Output data along a time axis in order that process sequence initiation/order/interruption can be identified. Further, the system 102 may use Digital Input/Output history data to aggregate typical/ideal sequence models for sub-processes. Furthermore, the system 102 may use the typical/ideal sequence models for comparison 'centre-line' or 'nominal' measurement and to identify deviations from such—either for other historic recorded sequences or dynamically as 'live' process monitoring comprising current PLC routine.

In some embodiments, the system 102 is further configured to use event logs comprising timestamp data along a time axis, e.g. system alarm event message, as a 'waypoint reference' by comparing 'before event' and 'after event' data comprising digital I/O, analogue I/O and other event logs to identify and measure difference—as beginning point for causal analysis (which may be human or AI based analysis).

In some embodiments, the system 102 may represent analogue data along a time axis in order that rates of change and shapes (i.e. data topology) are used to extract functional features from the analogue data, e.g. cyclic components, underlying trends, outliers, and so forth. Further, the system 102 may compare the functional features against 'model' data for deviation or be cross-referenced with PLC setpoint data to identify event triggers. In some embodiments, the system 102 is further configured to use the three groups of time series PLC data in combination to systematically unpick a causal chain of an event.

In some embodiments, the system 102 may capture a sequence of PLC control events, and therefore when an unexpected event occurs for example, an input sensor failure or failure of the controller logic, then the user 104 may view and analyse the PLC sequence data via playback of the PLC sequence data and can reach to an intended conclusion.

In some embodiments, the system 102 may supervise the learning based on historic datasets containing all three groups of data. Further, the system 102 may automatically monitor and predictively alert current process control centres to deviations. That are not detectable or interpretable by existing supervisory systems. Further, the system 102 may enable the user 104 to view the PLC sequence data and the Time Series Visualization for analysis on the display device 106.

In some embodiments, the system 102 may process a plurality of high-volume data memory sources into small memory transmissions via telemetry or cellular communication standards to SCADA or central hub monitoring and controllers.

In some embodiments, the system 102 may combine individual digital and analog data points with internal derivations of combined data and data look up tables to create performance tracking and forecasting functions. In some embodiments, the system 102 may derive energy calculations from multiple single data parameters and measured data records into a software algorithm to calculate statements of equivalent energy consumption. In some embodiments, the system 102 may transmit data parameters, energy statements, derived performance tracking and forecast servicing events transmitted securely using internet API protocols.

Further, the system 102 may be configured to record the PLC sequence on a selected time-base over a long period of operation. The time-base may have any required time interval ,typically a fixed time interval, with the base selected dependent upon the type of process being controlled and/or the type of control system—for example (without limitation) a 1 second base or a 1 minute fixed time base could be used in embodiments. Furthermore, the system 102 may provide the ability to apply display icons for system components, ability to trend analog information, collect alarm and warning messages and a sequence memory timing chart.

Figure 2A:
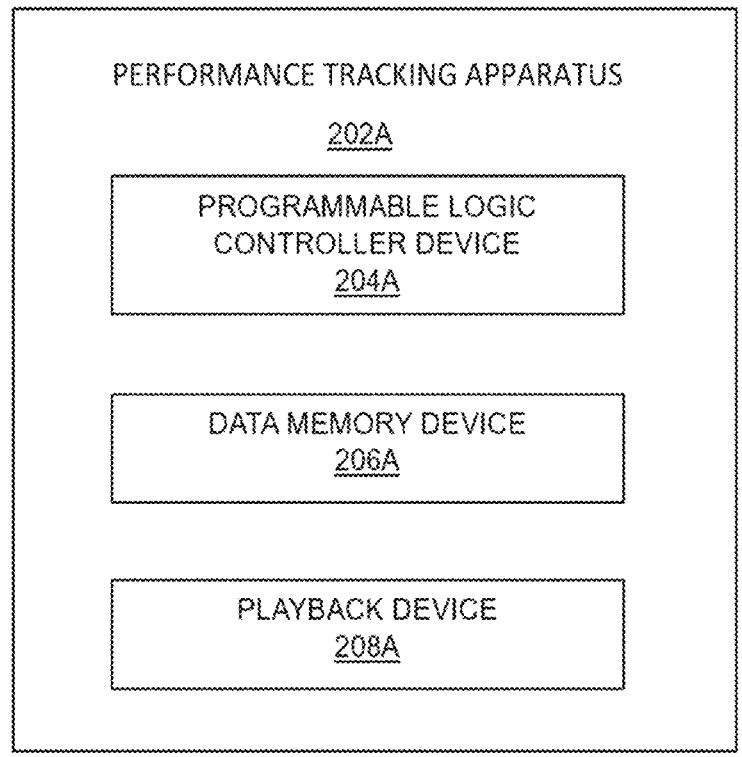
FIG. 2A is a block diagram illustrating system elements of an exemplary performance tracking apparatus, in accordance with an embodiment of the present disclosure.

FIG. 2A is a block diagram 200A illustrating system elements of an exemplary performance tracking apparatus 202A, in accordance with an embodiment of the present disclosure. As shown, the performance tracking apparatus 202A includes a Programmable Logic Controller (PLC) device 204A, a data memory device 206A, and a playback device 208A.

Figure 2B:
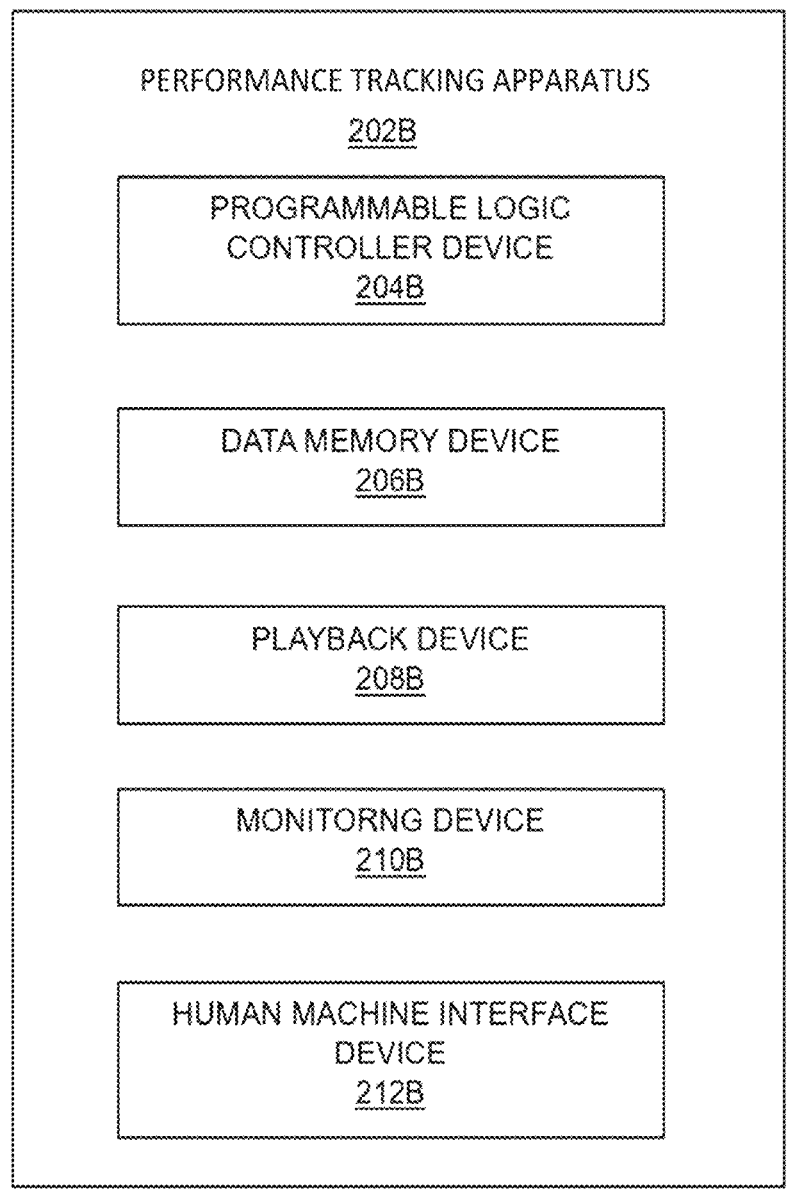
FIG. 2B is a block diagram illustrating system elements of another exemplary performance tracking apparatus, in accordance with another embodiment of the present disclosure.

In some embodiments, the performance tracking apparatus 202A may include additional modules or devices as shown in the FIG. 2B. FIG. 2B shows a block diagram 200B illustrating system elements of a performance tracking apparatus 202B. The performance tracking apparatus 202B primarily includes a Programmable Logic Controller (PLC) device 204B, a data memory device 206B, a playback device 208B, a monitoring device 210B, and a human machine interface (HMI) device 212B.

The Programmable Logic Controller (PLC) device 204B, the data memory device 206B, and the playback device 208B are similar in structure and functionality to that of the Programmable Logic Controller (PLC) device 204, the data memory device 206A, and the playback device 208A.

Depending on the inputs and outputs, the PLC device 204A is configured to monitor and record run-time data such as machine productivity or operating temperature, automatically start and stop processes, generate alarms if a machine (i.e. an automation system) malfunction, and more. The PLC device 204A is configured to receive inputs or input data from one or more input devices. The PLC device 204A is configured to process input data to generate formatted output data for example, for one or more output device. Performance tracking apparatus 202A is further configured to generate PLC sequence data based on at least one of the input data, output data, timeseries PLC data, and at least one event log over time. The PLC sequence data my include system sequence data. In some embodiments, performance tracking apparatus 202A is configured to process the input data and the timeseries PLC data to create Time Series Visualization for analysis with reference to a common UTC timebase.

In some embodiments, performance tracking apparatus 202A may capture a sequence of PLC control events, and therefore when an unexpected event occurs for example, an input sensor failure or failure of the controller logic, then the user 104 may view and analyse the PLC sequence data, wherein the playback device 208A enables the user 104 to playback the PLC sequence data and this way the user 104 can reach to an intended conclusion.

In some embodiments, the PLC device 204A may be a PLC of an automation system. In some embodiments, the performance tracking apparatus 202A may use at least one of three groups of time series PLC data to visualize and interrogate the process under control. The three groups of timeseries PLC data may include Digital Input/Output data, Analogue Input/Output data and the event logs.

In some embodiments, the performance tracking apparatus 202A is configured to represent the Digital Input/Output data along a time axis in order that process sequence initiation/order/interruption can be identified. Further, the performance tracking apparatus 202A may use Digital Input/Output history data to aggregate typical/ideal sequence models for sub-processes. Furthermore, the performance tracking apparatus 202A may use the typical/ideal sequence models for comparison 'nominal' or 'centre-line' measurement and to identify deviations for other historic recorded sequences or dynamically as 'live' process monitoring comprising current PLC routine.

In alternative embodiments, performance tracking apparatus 202A may be configured to use event logs comprising timestamp data along a time axis (e.g. system alarm event message) as a 'waypoint reference' by comparing 'before event' and 'after event' data comprising digital I/O, analogue I/O and other event logs to identify and measure difference—as beginning point for causal analysis.

In some embodiments, the performance tracking apparatus 202A PLC device is further configured to represent analogue data along a time axis in order that rates of change and shapes (data topology) are used to extract functional features from the analogue data for example, cyclic components, underlying trends, outliers, and so forth. Further, the performance tracking apparatus 202A may be configured to compare the functional features against 'model' data for deviation or be cross-referenced with PLC setpoint data to identify event triggers.

In some embodiments, the performance tracking apparatus 202A is further configured to use the three groups of time series PLC data in combination to systematically unpick a causal chain of an event.

The data memory device 206A is configured to store information comprising at least one of the generated formatted output data, the input data, and PLC sequence data. The information is not lost when the PLC device 204A steps onto a next sequence step. Further, the data memory device 206A may be configured to record the PLC sequence on a selected time-base over a long period of operation. In some embodiments, the data memory device 206A of the performance tracking apparatus 202A may include a secure hard-wire RS232 data diode firewall to improve system fault diagnostics, system optimization, software validation, operator training through visualization of PLC control sequences/PLC sequence data. The data memory device 206A may retain PLC system sequence in a memory format and machine language compatible with smartphone, web browser, factory management systems, SCADA, eSCADA, telemetry and similar hub asset management systems.

As discussed with reference to the FIG. 1, the playback device 208A is configured to enable a user, such as the user 104, to search the PLC sequence data from the data memory device 206A and playback the PLC sequence data. The user 104 may playback the PLC sequence data for analysis such as, but not limited to, a causal analysis to identify a cause of an event. The playback device 208A may also be configured to enable the playback of the PLC sequence data against a timeline.

Turning now to the FIG. 2B, the monitoring device 210B is configured to supervise the learning based on historic datasets containing all three groups of data. Further, the monitoring device 210B is configured to automatically monitor and predictively alert current process control centres to deviations that may not be detectable or interpretable by existing supervisory systems.

The human machine interface (HMI) device 212B is configured to enable the user 104 to view the PLC sequence data and the Time Series Visualization for analysis. The HMI device 212B may also provide one or more user interfaces to the user 104 for interacting with the system 202B. Furthermore, the HMI device 212B may be configured to provide the ability to apply display icons for system components, ability to trend analog information, collect alarm and warning messages and a sequence memory timing chart.

In some embodiments, the performance tracking apparatus 202A and 202B may provide the user 104 with methods or techniques to record digital, analog and warning/alarm data parameters from a plurality of controllers and discrete devices on a common time-base that are presented on a searchable viewer program, where individual parameters can be selected/deselected on demand.

In some embodiments, the performance tracking apparatus 202A and 202B may be configured to process high frequency data sampling (for example 1 second) locally on from the PLC device 204A and 204B, respectively to create derived calculations.

In some embodiments, performance tracking apparatus 202A and 202B may be configured to routinely collate data into a single time-base from a number of data sources local to the sources, giving the benefit of local high frequency data processing and low data transmission. This benefit manifests itself most clearly in the cost of data transmission by cellular connection. In some embodiments, the transmission of high data volume sampling at, for example, 1 second may result in large data usage (like using your cell phone for streaming services without WIFI) whereas the disclosed embedded data memory (eDM) device (See 318 in the FIG. 3) output typically for a full month of operation uses less than 1 gb of data; and on older telemetry systems such high data transmission rates usually consumes the available telemetry capacity (baud rate) reserved for critical supervisory and control functions.

Figure 3:
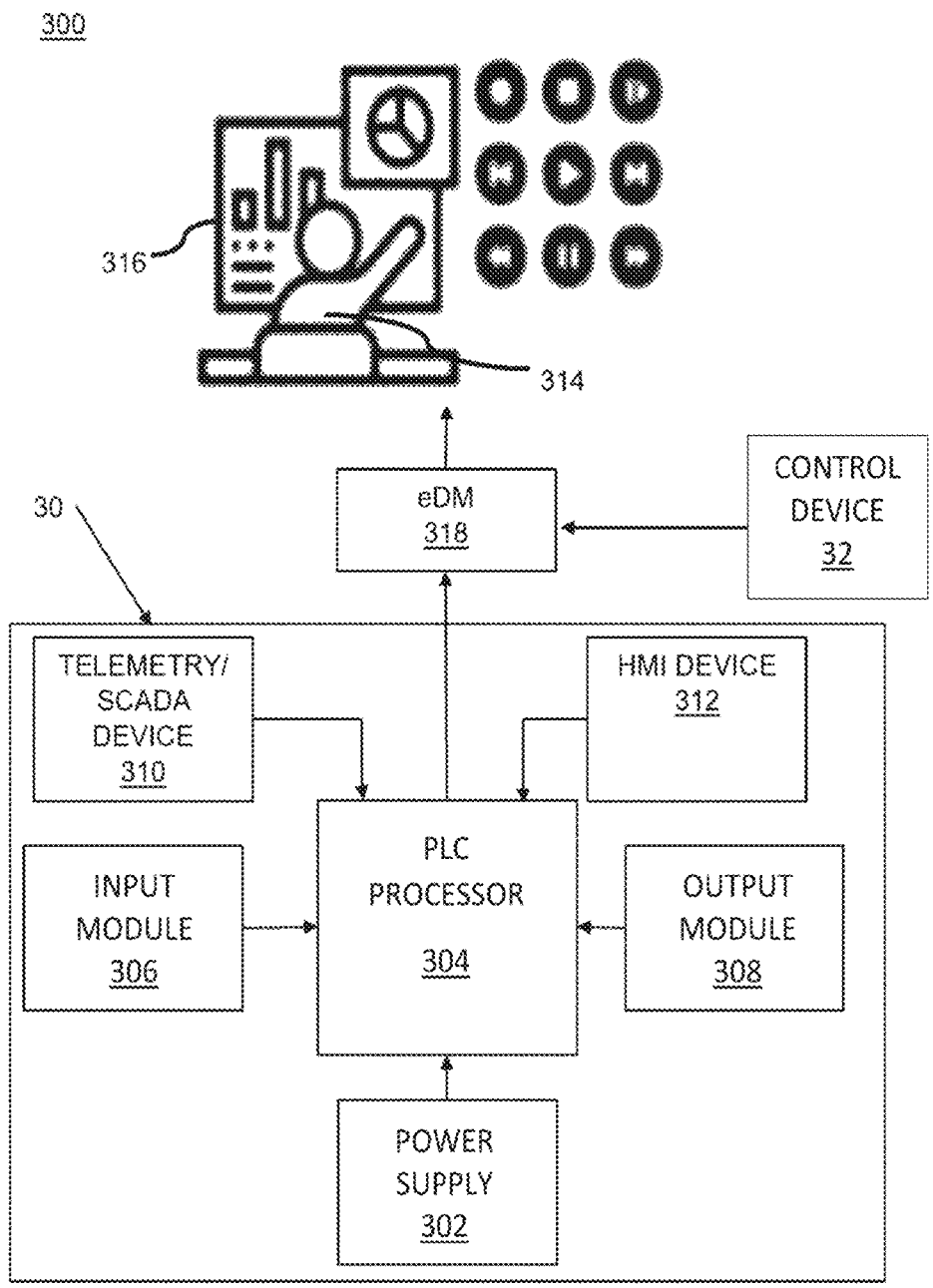
FIG. 3 illustrates an exemplary system for processing and playback of data, in accordance with an embodiment of the present disclosure.

FIG. 3 illustrates another exemplary system 300 for performance monitoring or tracking, in accordance with another embodiment of the present disclosure. The system 300 includes an embedded data memory (eDM) device 318 configured to receive data from a plurality of control system devices 30, 32. One control device 30 is illustrated in detail as a PLC. The PLC 30 including a power supply 302, a processor 304, an input module 306, an output module 308, a Telemetry/SCADA device 310, an HMI device 312. The system 300 also includes a user interface 314, and a display device 316.

In the PLC system 30, the power supply 302 may supply power to the PLC processor 304. An input module 306 may to receive inputs from at least one input source (for example linked to a system being controlled). A PLC processor 304 is configured to process said inputs according to a control logic stored on a machine-readable memory of the processor to provide outputs. An output module 308 to issue said outputs to a connected device.

The embedded data memory (eDM) device 318 may be a hardwire firewall protected embedded data memory unit connected to a plurality of control devices shown by the example PLC devices 30 and control device 32. Any suitable number of control devices may be connected to the eDM 318. The embedded data memory (eDM) device 318 can record data parameters from a number of PLC and discrete devices/system similar to the PLC system 30 onto a singular time-base for example, on the display device 316 local to the data sources and provide a summarized tracking and forecasting instructions. One skilled in the art will appreciate that the system 300 may include multiple PLC system 30 and the embedded data memory (eDM) device 318 may record data parameters from a number of PLC systems.

In some embodiments, the system 300 may provide a user (via a user interface 314) with methods or techniques to record digital, analog and warning/alarm data parameters from a plurality of controllers and discrete devices on a common time-base that are presented on a searchable viewer program, where individual parameters can be selected/de-selected on demand.

The performance tracking apparatus 300 may be configured to process high frequency data sampling (for example 1 second) locally on from the PLC device to create derived calculations. The performance tracking apparatus 300 may be configured to receive input data and process the input data to generate formatted outputs or output data. The performance tracking apparatus 300 is also configured to generate PLC sequence data based on at least one of the input data, output data, timeseries PLC data, and at least one event log over time. The performance tracking apparatus 300 may store information comprising at least one of the generated formatted output data, the input data, event logs, the PLC sequence data, and so forth. The information is not lost when the PLC device of the system 304 steps onto a next sequence step.

The performance tracking apparatus 300 is also configured to enable the user 104 to search the PLC sequence data from the data memory device and playback the PLC sequence data e.g. on the display device 316.

In some embodiments, the performance tracking apparatus 300 may process the input data and the timeseries PLC data to create Time Series Visualization for analysis. In some embodiments, the user 314 can be any person interacting with the performance tracking apparatus 300. The user 314 may interact with the system 102 for analysing the PLC data and for the Time Series Visualization for analysis.

Further, the performance tracking apparatus 300 may be configured to enable the playback of the PLC sequence data against a timeline. The PLC sequence data may include system sequence data. In some embodiments, the performance tracking apparatus 300 may use at least one of three groups of time series PLC data to visualize and interrogate the process under control. The three groups of timeseries PLC data may include Digital Input/Output (I/O) data, Analogue Input/Output data and the event Logs.

In some embodiments, the performance tracking apparatus 300 may represent the Digital Input/Output data along a time axis in order that process sequence initiation/order/interruption can be identified. Further, the performance tracking apparatus 300 may use Digital Input/Output history data to aggregate typical/ideal sequence models for sub-processes. Furthermore, the system may use the typical/ideal sequence models for comparison 'nominal' or 'centre-line' measurement and to identify deviations from 'norm'—either for other historic recorded sequences or dynamically as 'live' process monitoring comprising current PLC routine.

In some embodiments, the performance tracking apparatus 300 is further configured to use event logs comprising timestamp data along a time axis, e.g. system alarm event message, as a 'waypoint reference' by comparing 'before event' and 'after event' data comprising digital I/O data, analogue I/O data and other event logs to identify and measure difference—as beginning point for causal analysis.

In some embodiments, the performance tracking apparatus 300 may represent analogue data along a time axis in order that rates of change and shapes (i.e. data topology) are used to extract functional features from the analogue data, e.g. cyclic components, underlying trends, outliers, and so forth. Further, the performance tracking apparatus 300 may compare the functional features against 'model' data for deviation or be cross-referenced with PLC setpoint data to identify event triggers.

In some embodiments, the performance tracking apparatus 300 is further configured to use the three groups of time series PLC data in combination to systematically unpick a causal chain of an event. In some embodiments, the performance tracking apparatus 300 may supervise the learning based on historic datasets containing all three groups of data. Further, the performance tracking apparatus 300 may automatically monitor and predictively alert current process control centres to deviations. That are not detectable or interpretable by existing supervisory systems. Further, the performance tracking apparatus 300 may enable the user to view the PLC sequence data and the Time Series Visualization for analysis on the display device 316.

Further, the performance tracking apparatus 300 is configured to Process a plurality of high-volume data memory sources into small memory transmissions via telemetry or cellular communication standards to Telemetry/SCADA (supervisory, control and data acquisition) device 310 or central hub monitoring and controllers. The Telemetry/SCADA device 310 may be a hub management system.

The HMI device 312 is configured to show events as 'messages' and in some embodiments, the HMI device 312 is configured to calculate trends and graphical information that may be derived from ladder logic events.

In some embodiments, the transmission of high data volume sampling at a fixed time interval (for example 1 second) may result in large data usage (like using your cell phone for streaming services without WIFI) whereas the disclosed embedded data memory (eDM) device 318 output typically for a full month of operation uses <1 gb (gigabyte) of data; and on older telemetry systems such high data transmission rates usually consumes the available telemetry capacity (baud rate) reserved for critical supervisory and control functions.

In some embodiments, the performance tracking apparatus 300 may process a plurality of high-volume data memory sources into small memory transmissions via telemetry or cellular communication standards to SCADA or central hub monitoring and controllers.

In some embodiments, the performance tracking apparatus 300 may combine individual digital and analog data points with internal derivations of combined data and data look up tables to create performance tracking and forecasting functions.

In some embodiments, the performance tracking apparatus 300 may derive energy calculations from multiple single data parameters and measured data records into a software algorithm to calculate statements of equivalent energy consumption.

In some embodiments, the performance tracking apparatus 300 may transmit data parameters, energy statements, derived performance tracking and forecast servicing events transmitted securely using hard wire transmit only firewall and internet API protocols.

Figure 4:
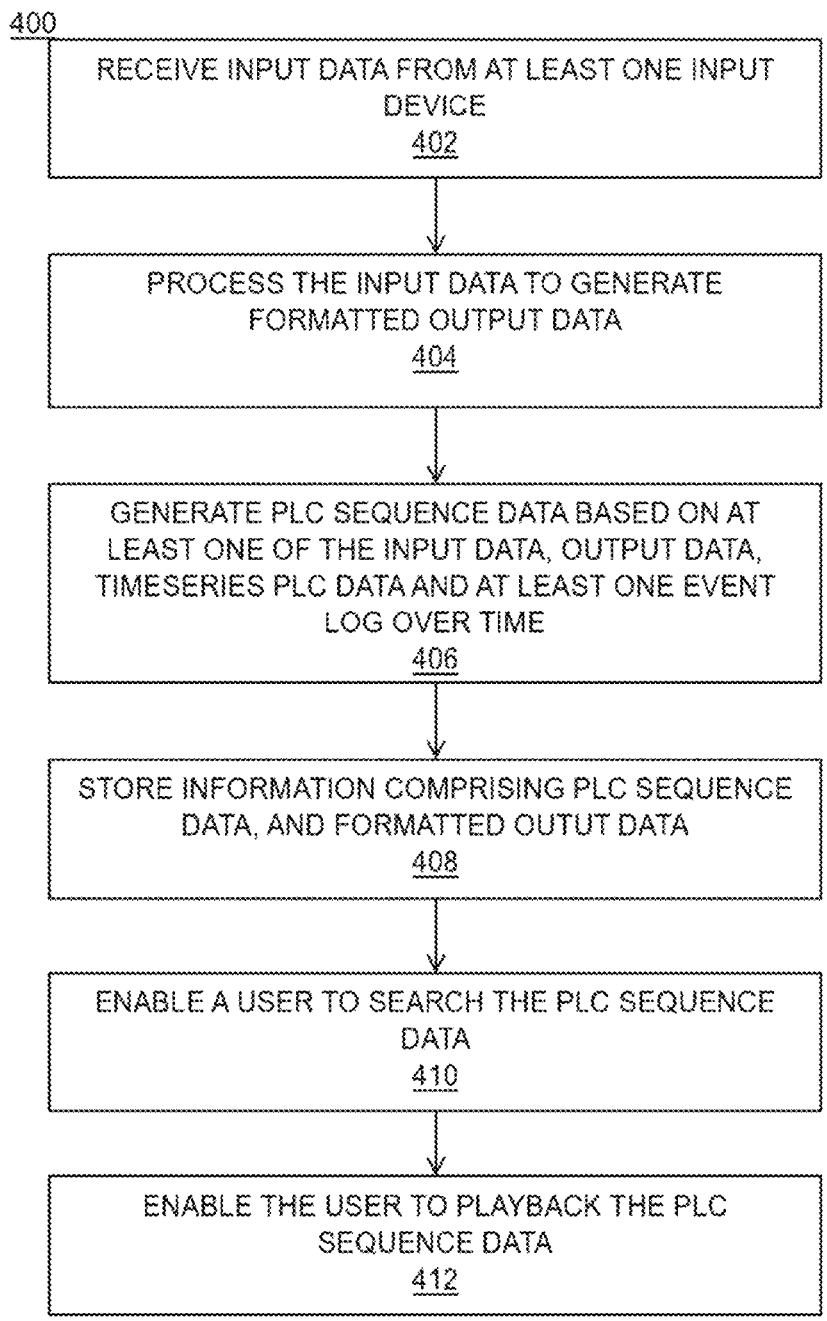
FIG. 4 is a flowchart illustrating a method for playback of PLC data, in accordance with an embodiment of the present disclosure.

FIG. 4 is a flowchart illustrating a method 400 for playback of PLC data, in accordance with an embodiment of the present disclosure. As discussed with reference to the FIG. 2A, the performance tracking apparatus 202A includes the PLC device 204A, the data memory device 206A, and the playback device 208A.

At step 402, the performance tracking apparatus 202A receives input data from at least one input device. In some embodiments, the PLC device 204A receives input data from at least one input device such as the device 306 as shown in the FIG. 3.

At step 404, the performance tracking apparatus 202A processes the input data to generate formatted output data. In some embodiments, the PLC device 204A processes the input data to generate formatted output data for example for the output device 308.

Then at step 406, the performance tracking apparatus 202A displays PLC sequence data based on the selected input data, output data, timeseries plc data and at least one event log over time. Thus, in embodiments the apparatus allows the user to select groupings of parameters and update the selections as configurations. In some embodiments, the performance tracking apparatus 202A generates PLC sequence data based on at least one of the input data, output data, timeseries plc data and at least one event log over time.

At step 408, the performance tracking apparatus 202A stores information comprising PLC sequence data, and formatted output data. In some embodiments, the data memory device 206A stores information comprising PLC sequence data, and formatted output data. Further, the information is not lost when the PLC device 204A steps onto a next sequence step.

Then at step 410, the performance tracking apparatus 202A enables a user, such as the user 314, to search the PLC sequence data. In some embodiments, the playback device 208A enables the user 314, to search the PLC sequence data.

Thereafter at step 412, the performance tracking apparatus 202A enables the user 314 to playback the PLC sequence data. In some embodiments, the playback device 208A enables to playback the PLC sequence data. For example, the user 314 may use the system 304 (or the 202A) for researching a recurring failure of a complex system such as a water treatment system. The playback device 208A of the system 202A may enable the user 314 to pinpoint the root cause of a complex system failure. The apparatus may, therefore, further enable an automated decision tree to be set up for control system fault finding.

Figure 5:
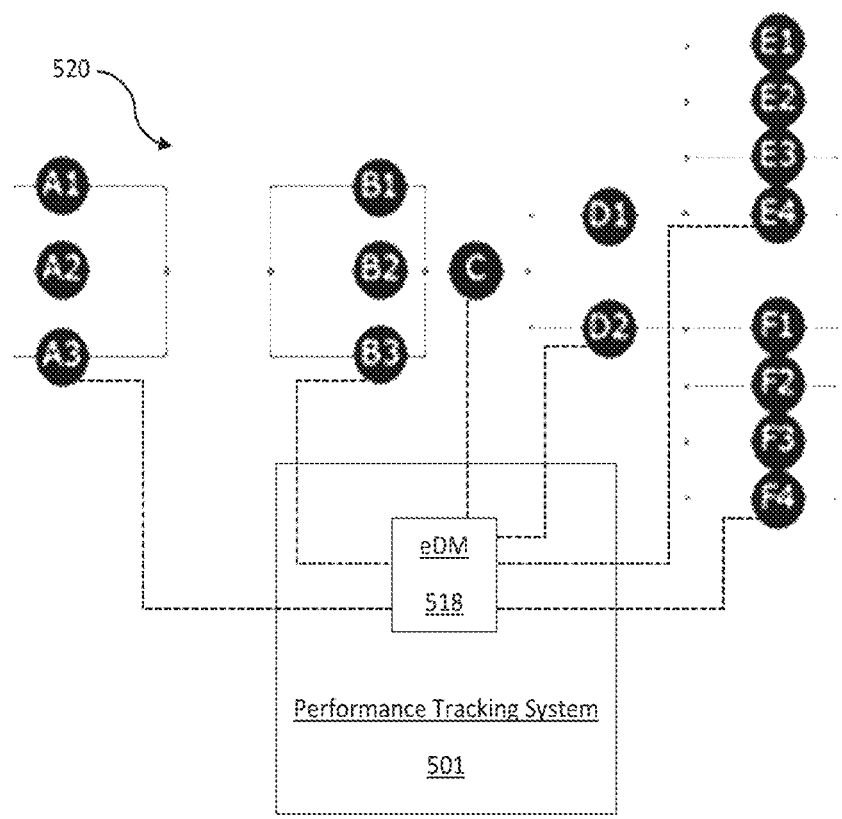
FIG. 5 is an example of an apparatus in accordance with an embodiment in a complex control system.

FIG. 5 provides an example of the implementation of a performance tracking system 501 of an embodiment in a complex control system 520. The control system 520 may for example be an industrial flow control system. The control system 520 includes various stages which may each include a plurality of parallel systems each controlled by a dedicated control device. Each device is represented in the schematic by an alphanumeric indicator A1 through F4. Each device may include a PLC based control (or some may include other controllers) and may for example be connected to and used to control a corresponding piece of industrial apparatus. The embedded data memory device 518 is in communication with each local control device (for clarity it will be noted that only a single connector line is indicated to each group of devices, for example group A1 to A3, in FIG. 5 but in practice a connection may connect each separate device in the group). The embedded data memory device 518 monitors the plurality of control devices A1 to F4 and receives data related to the inputs, outputs and events of each control device during operation of the system 520. The embedded data memory device 518 time stamp said data on a common time base, for example using a UTC based clock. The resulting time-based sequence data for each of the plurality of control devices (A1 through F4) is then stored by the embedded data memory device 518 (for example in a data store included in or attached to the performance tracking apparatus 501). A processor (not shown in FIG. 5) of the performance tracking system 501 compile the sequence data stored by the data memory device 518 for the plurality of control devices (A1 through F4) into a common data stack.

Figure 6:
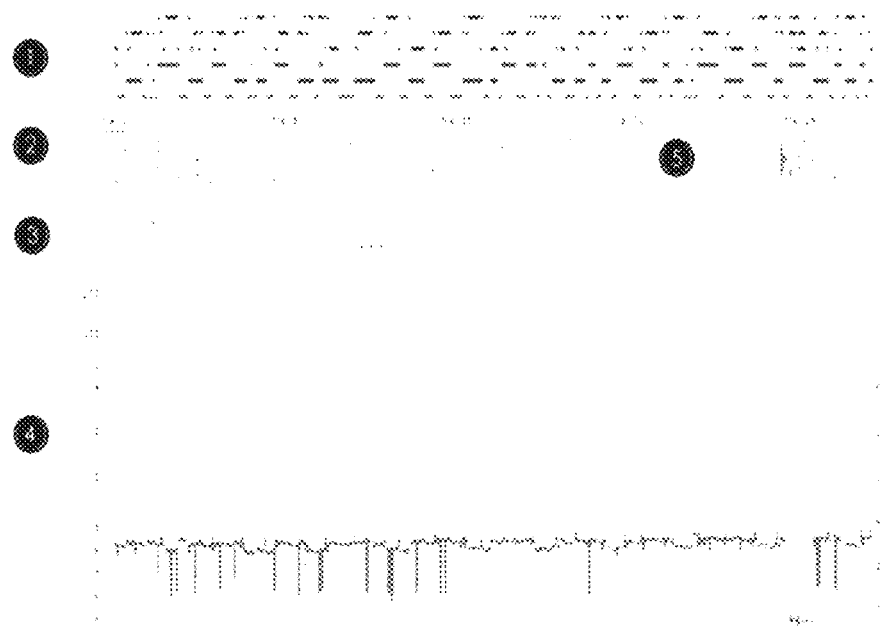
FIG. 6 is an example of a visualisation of a data-stack provided by an embodiment of the invention.

FIG. 6 shows an example of a visualisation of a data-stack in accordance with an embodiment. The y-axis of the visualisation shows the common UTC time base. It can be seen that the visualisation enables a user to track specific events, for example alarm or warning messages and cross reference digital parameters, analog parameters and messages from across a control system.

A key aspect of this method is the visual topography alignment of multiple parameters and the method to select to display or hide each parameter as required to identify deviations from the centreline performance.

Figure 7:
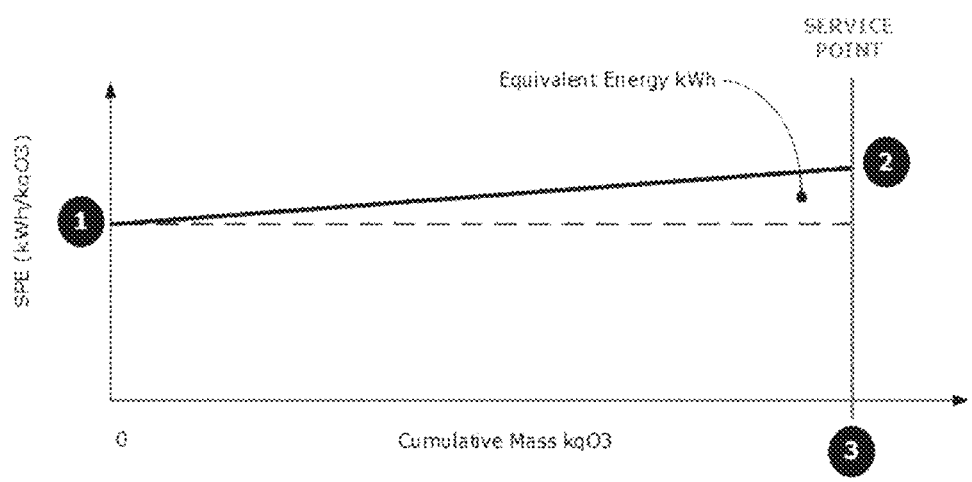
FIG. 7 is an example of performance tracking in an embodiment of the invention.

FIG. 7 shows an example of a performance tracker provided by an embodiment. The performance tracking system of an embodiment is pre-programmed with an algorithm for combing multiple parameters from the control system devices into a required metric. The metric may then be tracked on an ongoing (i.e. 'live') basis by the tracking system with deviation of the metric from the centre line performance both visualised and topology such as trends towards excessive deviation available to a human or AI analyst. It may be appreciated that once the initial set up of content and equations has been established (which may for example be done be a specialist engineer for any particular control system) tracking using embodiments may be automated using machine learning and AI. For example, embodiments may be used to monitor and detect or predict systems energy creep and or duty driven servicing requirements.

In the example of FIG. 7 the system is used to define a Service Point Efficiency (SPE). Embodiments use the SPE metric to track and calculate the energy cost product of multiple data parameters. From experience/operational history it is possible to know the cost of servicing the system to return the system to optimum efficiency and as such the system can be used to set a point—the Service Point Efficiency 'SPE' at which the system owner receives a duty driven forecast date for the most efficient servicing event where the ongoing operational cost reduction from the service improvement gives the shortest payback for the cost of the servicing event. Thus, it will be appreciated that this is an example of how embodiments of the invention can be used in practice to provide operational benefits.

The disclosed performance tracking apparatus may be configured to record digital, analog and warning/alarm data parameters from a plurality of controllers and discrete devices on a common time-base that are presented on a searchable viewer program, where individual parameters can be selected/deselected on demand.

Further, the disclosed performance tracking apparatus may include a hardware transmit only firewall protected embedded data memory embedded data memory (eDM) device is connected to the PLC device to give data protection at the data source.

Further, the disclosed performance tracking apparatus may be configured to process high frequency data sampling (typically 1 second) locally on from the programmable logic controller or PLC device to create derived calculations.

Further, the disclosed performance tracking apparatus may be configured to process a plurality of high-volume data memory sources into small memory transmissions via telemetry or cellular communication standards to SCADA device or central hub monitoring and controllers.

Further, the disclosed performance tracking apparatus may be configured to combine individual digital and analog data points with internal derivations of combined data and data look up tables to create performance tracking and forecasting functions.

Further, the disclosed performance tracking apparatus may be configured to derive energy calculations from multiple single data parameters and measured data records into a software algorithm to calculate statements of equivalent energy consumption.

Furthermore, the disclosed performance tracking apparatus may be configured to transmit data parameters, energy statements, derived performance tracking and forecast servicing events transmitted securely using hard wire transmit only firewall and internet API protocols.

Furthermore, the disclosed performance tracking apparatus may comprise embedded data memory device(s) that can be installed at automation systems or automation system's site to create 'timing charts' of equipment operation for 'playback' features.

The present disclosure provides systems and methods for PLC data processing, memory and playback application.

Further, the present disclosure provides a system, an apparatus, an equipment, a method and an application of PLC sequence data processing, and providing a searchable memory for playback of system operation.

The disclosed performance tracking apparatus including the embedded data memory device is a robust system. The data memory device may be used to produced formatted data outputs to Excel spreadsheet, smartphone app and HTML web page sequence timing charts, that may be used by locally processing and committing to memory the PLC sequence over time and PLC sequences can be 'playback'.

The present disclosure may provide a system configured to produce the embedded data for the data memory device by processing high volumes of data that then enables playback for diagnostics, validation of function, real-time status transmittal in small comms data volume.

The disclosed performance tracking apparatus may be configured to collect, process and retain real-time data and messages from a programmable logic controller device in an embedded data memory device to provide system managers with the ability to 'playback' complete PLC control system sequences. In some embodiments, the PLC device may include hard real-time programmable logic controllers that are the dominant industrial, medical, municipal methods/techniques of equipment process control.

In some embodiments, the data memory device of the performance tracking apparatus may include a secure hardwire unidirectional gateway RS232 firewall to improve system fault diagnostics, system optimization, software validation, operator training through visualization of PLC control sequences/PLC sequence data. The data memory device may retain PLC system sequence in a memory format and machine language compatible with smartphone, web browser, factory management systems, SCADA, eSCADA, telemetry and similar hub asset management systems.

In some embodiments, the machine learning, edge processing and similar artificial intelligence software systems can utilize the data-stack and performance tracking of the disclosed performance tracking apparatus to create watchdog, self-check and similar equipment health diagnostic tracking against intended PLC control sequences.

The disclosed performance tracking apparatus may be an economical and affordable embedded data memory solution on the PLC at the installation site versus the costs of data transfer to hub processing. Further, the disclosed systems may be compatible with the with emerging AI or machine learning systems without data processing in PLC systems, especially legacy systems already installed locally on the equipment and the data unit providing common consolidated data outputs to the hub processors.

The disclosed system can provide a searchable memory of PLC sequence. Further, the system may create Time Series Visualization for analysis enabling playback of system sequence data against a timeline. Currently, there are 3 groups of 'Time Series' PLC data that the system may use to visualize and interrogate the process under control. The three groups of data may include Digital I/O data, Analogue I/O data, and event logs. The Digital I/O data comprising Start, Finish, Duration are being represented along a time axis in order that process sequence initiation/order/interruption can be identified. Digital I/O history is being used to aggregate typical/ideal sequence models for sub-processes. These models can then be used for comparison 'centre-line' measurement and to identify deviations from 'norm'—either for other historic recorded sequences or dynamically as 'present' process monitoring (current PLC routine). The event logs comprising Timestamp may be used along a time axis (e.g. system alarm event message) as 'waypoint reference' where 'before event' and 'after event' data (digital I/O, analogue I/O and other event logs) can be compared to identify and measure difference—as beginning point for causal analysis. Further, the analogue I/O data may be represented along time axis in order that rates of change and shapes (data topology) can be used to extract functional features from data—e.g. cyclic components, underlying trends, outliers—that again can be compared against 'model' data for deviation or be cross-referenced with PLC setpoint data to identify event triggers.

The disclosed system may use historic datasets containing all three group of data methods to holistically supervise the learning and separately the testing of algorithms—that may automatically monitor and predictively alert current process control centres to deviations that are not detectable or interpretable by existing supervisory systems.

In some embodiments, the disclosed performance tracking apparatus and methods may be used for researching a recurring failure of a water treatment system. The playback feature of the system may enable user(s) to pinpoint the root cause of a complex system failure.

Method claims set forth below having steps that are designated by letters or numbered should not be considered to be necessarily limited to the particular order in which the steps are recited.

In addition, methods and functions described herein are not limited to any particular sequence, and the acts or blocks relating thereto can be performed in other sequences that are appropriate. For example, described acts or blocks may be performed in an order other than that specifically disclosed, or multiple acts or blocks may be combined in a single act or block.

Although the invention has been described above with reference to preferred embodiments, it will be appreciated that various changes or modification may be made without departing from the scope of the invention as defined in the appended claims.

The invention claimed is:

1. A control system performance tracking apparatus comprising:
   a data memory device coupled in use to a plurality of control devices of a control system, the data memory device being configured to:
     monitor the plurality of control devices;
     receiving data related to inputs, outputs and events of each control device;
     time stamp said data on a common time base; and
     store a resulting time-based sequence data for each of the plurality of control devices; and
   a processor configured to compile the sequence data for the plurality of control devices into a common data stack
   wherein the apparatus is further configured to:
     accumulate historical data to form at least one reference sequence data model; and
     compare a measured sequence data to the reference sequence data model to identify operational deviations,
   wherein the data memory device compiles at least the following groups of device data:
   Digital Input/Output data, Analogue Input/Output data and event logs and the reference sequence data model comprises Digital Input/Output data to provide reference sequence data models for sub-processes.

2. The performance tracking apparatus of claim 1, wherein the apparatus further comprises a playback method to enable a user to search and/or replay the data stack.

3. The performance tracking apparatus of claim 1, the processor is further configured to use the data stack to provide predicted future control system behaviour.

4. The performance tracking apparatus of claim 1, wherein the reference sequence data model is a data-stack model and the measured sequence data compares the measured data-stack to the data stack model.

5. The performance tracking apparatus of claim 1, wherein at least one of the plurality of control devices is a Programmable Logic Controller (PLC) device,
   the PLC device comprising: an input module to receive inputs from at least one input source; a processor configured to process said inputs according to a control logic stored on a machine readable memory of the processor to provide outputs; and an output module to issue said outputs to a connected device;
   and wherein the data memory device being embedded to and interfaced with the PLC device.

6. The performance tracking apparatus of claim 5, wherein the events of the PLC device include messages provided by the processor to a Human Machine Interface (HMI) and/or to a Supervisory, Control and Data Acquisition (SCDA) interface.

7. The performance tracking apparatus of claim 6, wherein the apparatus combines outputs from a plurality of SCADA systems.

8. The performance tracking apparatus of claim 1, wherein the data memory device comprises:
   an input interface for receiving data from the plurality of control devices;
   a clock;
   a processor configured to timestamp said received data; and
   a machine-readable data storage; and
   an output interface.

9. The performance tracking apparatus of claim 8, wherein the input interface comprises a unidirectional gateway firewall.

10. The performance tracking apparatus of claim 8, wherein the reference sequence model comprises Analogue Input/Output and comparing measured sequence data comprises comparing data topology.

11. The performance tracking apparatus of claim 8 wherein the data memory device is further configured to cross-reference time-stamped event log data as way points in the sequence data.

12. The performance tracking apparatus of claim 8, further comprising a monitoring device configured to monitor the Sequence data from the data memory device and issue an alert or notification based upon deviations from the reference sequence model.

13. A control system performance tracking apparatus comprising:
   a data memory device coupled in use to a plurality of control devices of a control system, the data memory device being configured to:
     monitor the plurality of control devices;
     receiving data related to inputs, outputs and events of each control device;
     time stamp said data on a common time base; and
     store a resulting time-based sequence data for each of the plurality of control devices; and
   a processor configured to compile the sequence data for the plurality of control devices into a common data stack
   wherein the data memory device comprises:
     an input interface for receiving data from the plurality of control devices;
     a clock;
     a processor configured to timestamp said received data; and
     a machine-readable data storage; and
     an output interface
   wherein the apparatus is further configured to:

accumulate historical data to form at least one reference sequence data model; and compare a measured sequence data to the reference sequence data model to identify operational deviations, and wherein the reference sequence model comprises Analogue Input/Output and comparing measured sequence data comprises comparing data topology.

14. A control system performance tracking apparatus comprising:

a data memory device coupled in use to a plurality of control devices of a control system, the data memory device being configured to:

monitor the plurality of control devices;

receiving data related to inputs, outputs and events of each control device;

time stamp said data on a common time base; and store a resulting time-based sequence data for each of the plurality of control devices; and a processor configured to compile the sequence data for the plurality of control devices into a common data stack wherein the apparatus is further configured to:

accumulate historical data to form at least one reference sequence data model; and compare a measured sequence data to the reference sequence data model to identify operational deviations, and wherein the data memory device is further configured to cross-reference time-stamped event log data as way points in the sequence data.

* * * * *